Jan. 29, 1963
D. L. LANG
3,075,377
APPARATUS FOR DETERMINING THERMAL
CONDUCTIVITY OF MATERIALS
Filed Oct. 17, 1956
4 Sheets-Sheet 1
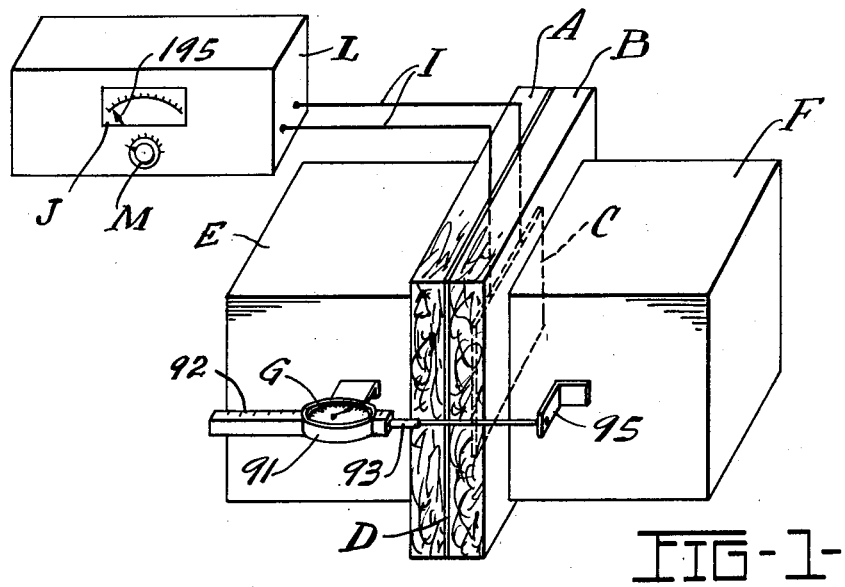
FIG-1-
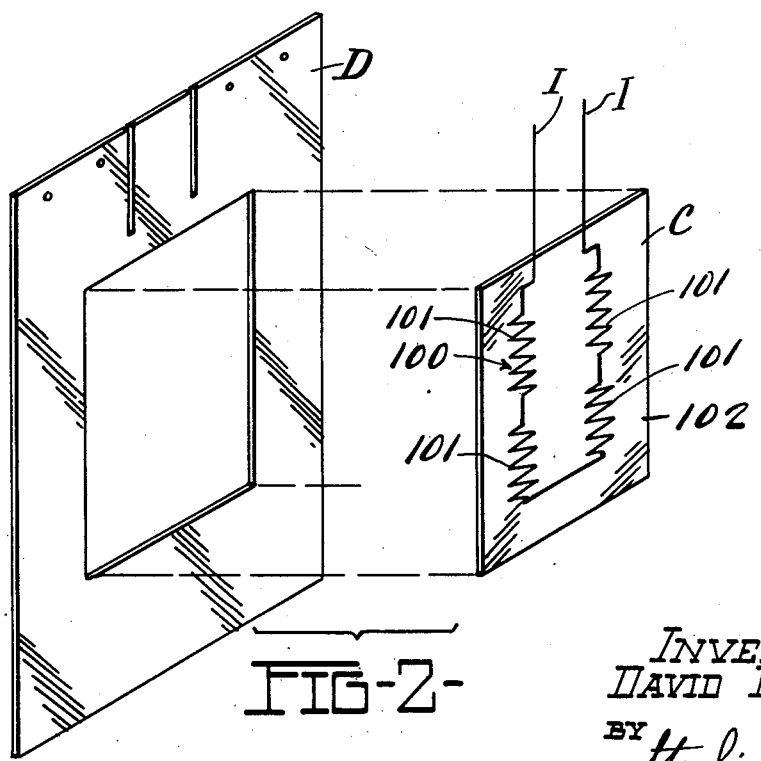
FIG-2-
INVENTOR:
DAVID L. LANG.
BY
ATTYS.

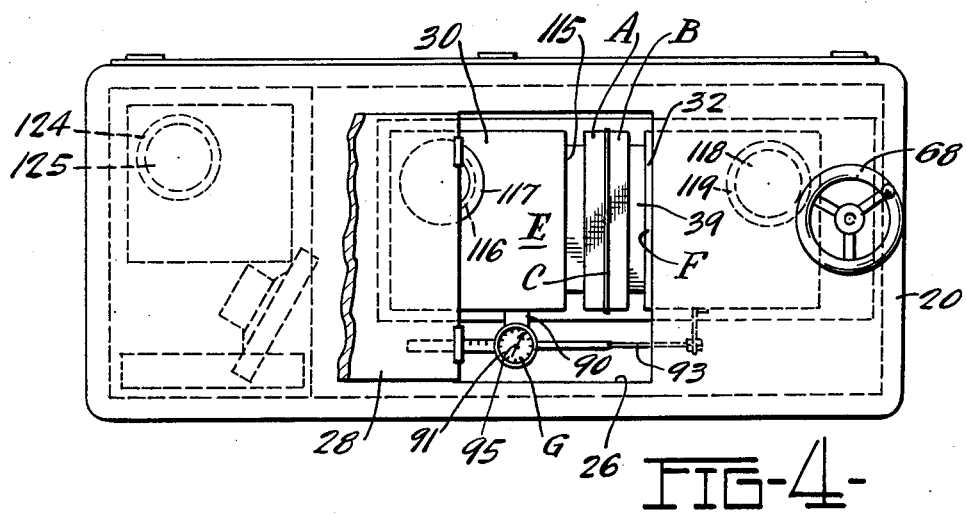
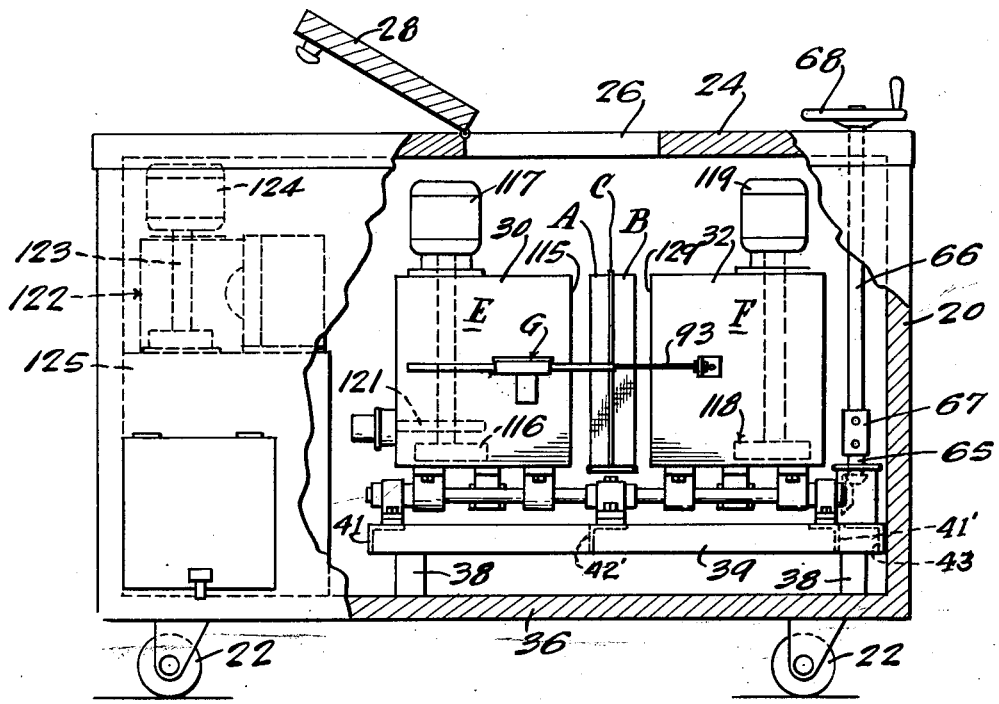

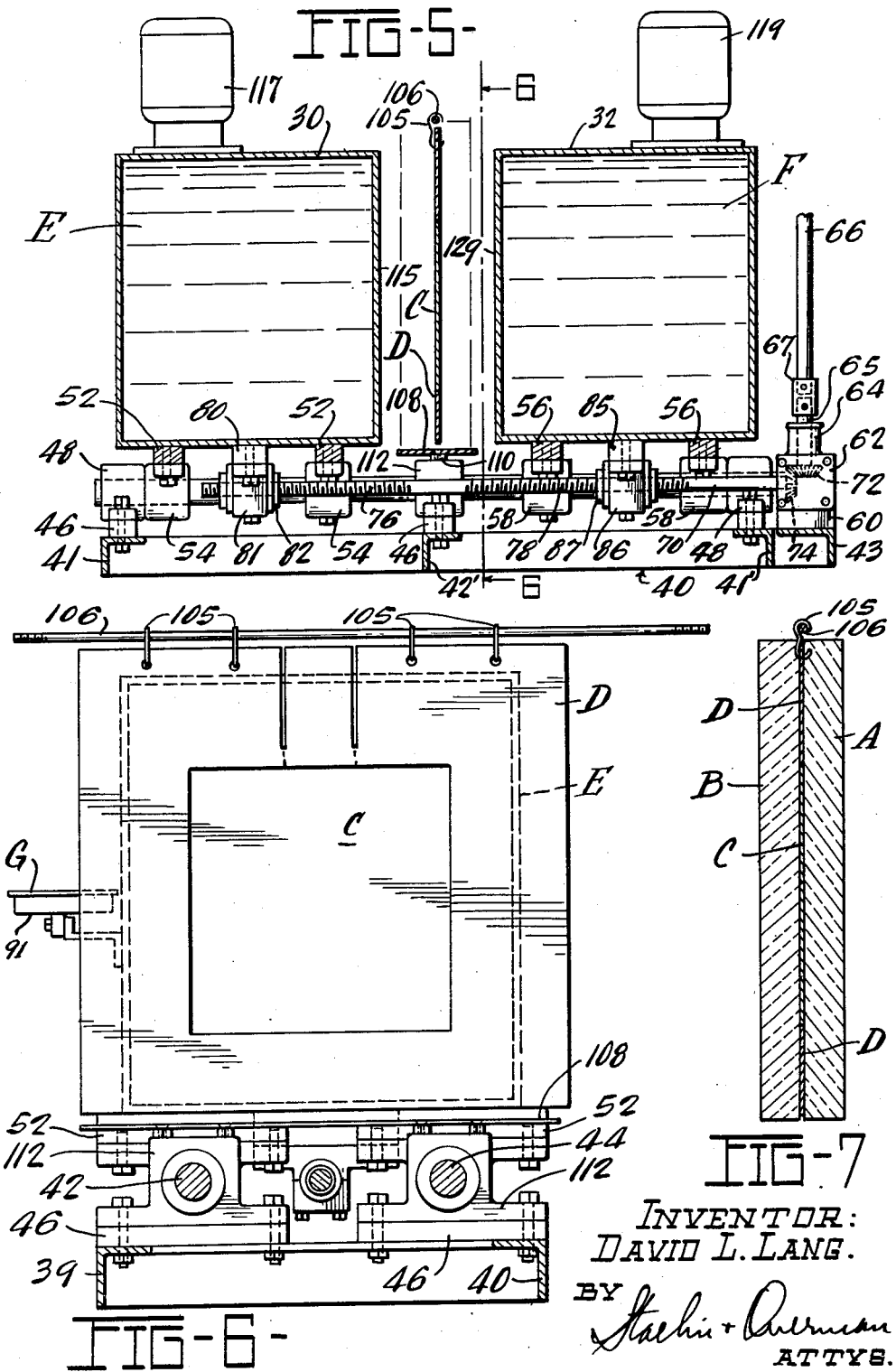

Jan. 29, 1963 D. L. LANG 3,075,377
APPARATUS FOR DETERMINING THERMAL
CONDUCTIVITY OF MATERIALS
Filed Oct. 17, 1956 4 Sheets-Sheet 4
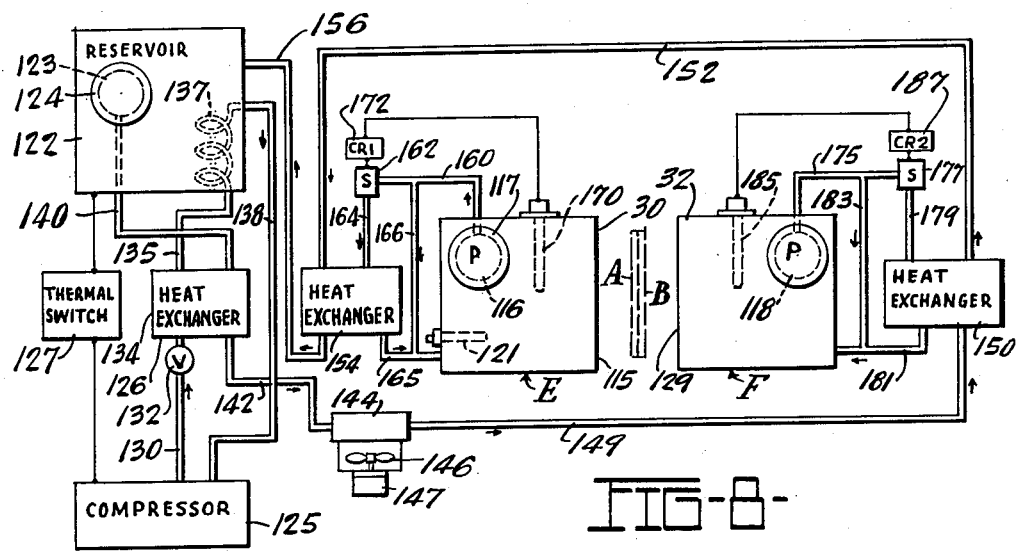
FIG-8-
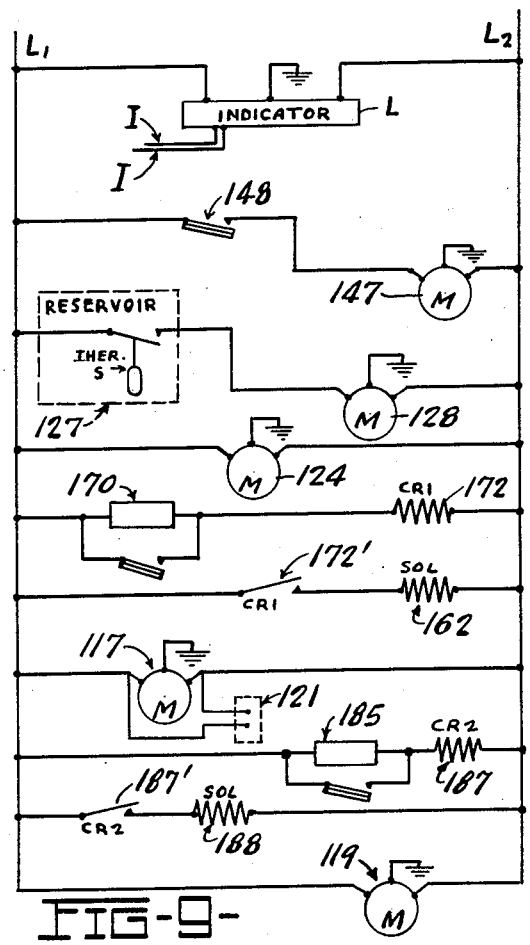
FIG-9-
INVENTOR:
DAVID L. LANG.
BY
ATTYS.

United States Patent Office 3,075,377
Patented Jan. 29, 1963

3,075,377
APPARATUS FOR DETERMINING THERMAL
CONDUCTIVITY OF MATERIALS
David L. Lang, Granville, Ohio, assignor to Owens-Corning Fiberglas Corporation, a corporation of Delaware
Filed Oct. 17, 1956, Ser. No. 616,455
5 Claims. (Cl. 73—15)

This invention relates to apparatus for determining the thermal conductivity of materials and more particularly to apparatus for quickly indicating or determining the thermal conductivity values of fibrous, porous, or cellular materials and may be utilized for ascertaining the thermal conductivity of other types of materials.

Heretofore many endeavors have been attempted to ascertain or determine the relative thermal conductivity values of materials and particularly materials used for heat insulation purposes. Due to the wide variations in densities of various insulating materials, the methods heretofore employed for industrial purposes such as quality control have required several hours time and skilled operation of operators to obtain reasonably accurate thermal conductivity factors for an insulation material. Among the methods heretofore used, that known as the "guarded hot plate" method has been employed most extensively for the purpose. The guarded hot plate method necessitates the utilization of expensive equipment or apparatus and a single test operation may require several hours and the services of a skilled operator to arrive at reasonably accurate results.

The present invention embraces a method of determining the thermal conductivity of materials through the utilization of a heat flow meter, transducer or heat sensing means whereby an accurate measurement of thermal conductivity may be accurately measured or determined in a comparatively short period of time.

Another object of the invention embraces a method of measuring the thermal conductivity of materials by establishing predetermined differential temperatures at spaced regions in the material and measuring the rate of heat flow by heat responsive means arranged in the path of heat flow through the material.

An object of the invention is a provision of a method of determining the thermal conductivity factor or value wherein a material to be tested is placed in contact with means at differential temperatures and in contact with a heat sensing means whereby heat flow through the material and the sensing means produces an indication proportional to the temperature gradient which is correlated with the rate of heat flow, providing a simple and effective method of determining the thermal conductivity factor such as the "k" factor of the material or other standard of measurement.

Another object of the invention embraces a method of measuring the relative thermal conductivity value of a material which includes the steps of disposing the material between elements at differential but constant temperatures with a heat sensing means associated with the material connected with an instrumentality for measuring the heat flow through the material.

Another object of the invention resides in a method of determining the thermal conductivity of a material in a comparatively short period of time through the utilization of a primary sensing element, a constant temperature heat source and heat sink, and establishing heat flow through the sensing device and measuring the potential generated by heat flow through the sensing device whereby the relative thermal conductivity may be readily determined.

Another object of the invention resides in a method of maintaining a constant temperature of a chamber by continuously applying heat to fluid in the chamber and intermittently circulating fluid at a reduced temperature effective to maintain the temperature of the chamber substantially constant.

Another object of the invention is the provision of apparatus for determining the thermal conductivity of materials through the utilization of a heat sensing unit, a constant temperature heat source and a constant temperature heat sink arranged to obtain a direct reading in electrical units of the heat flow through the heat sensing unit, avoiding the maintenance of cold junctions and guard temperature adjustment, and which may be operated by unskilled operators.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a diagrammatic view illustrating the method of the invention for measuring or determining the thermal conductivity factor of a material;

FIGURE 2 is a diagrammatic view illustrating a heat sensing means or thermoelectric transducer and mounting therefor utilized in carrying out the method;

FIGURE 3 is an elevational view partly in section of a form of apparatus for carrying out the method of the invention;

FIGURE 4 is a top plan view of the form of apparatus illustrated in FIGURE 3;

FIGURE 5 is a longitudinal sectional view showing the temperature controlled heat transfer elements and means for adjusting the positions of the elements;

FIGURE 6 is a transverse sectional view taken substantially on the line 6—6 of FIGURE 5;

FIGURE 7 is a vertical sectional view through the heat sensing means and specimen of material to be tested for thermal conductivity;

FIGURE 8 is a diagrammatic view illustrating components of the apparatus and fluid circuits therefor, and FIGURE 9 is a diagram illustrating the electrical instrumentalities, circuits and controls for the components of the apparatus.

While the method and apparatus of the invention are illustrated as especially adapted for determining the thermal conductivity of fibrous insulating material, such as a mat formed of glass fibers, it is to be understood that the principles of the invention may be utilized for determining thermal conductivity factors of other materials such as cotton or felt, mats formed of slag wool or rock wool, any porous or cellular materials such as foam plastics, sponge rubber, or substantially any material which is endowed with heat flow retarding characteristics.

The principles of the invention embrace a method of measuring or indicating a thermal conductivity value or factor of a material such as fibrous insulation utilizing an apparatus in which the basic component include a heat sensing means or heat meter, a constant temperature heat source, a constant temperature heat sink or region of reduced but constant temperature and an indicating or measuring means such as an electrical instrument suitable for measuring minute electrical potential or electromotive force set up by heat flow through the heat sensing means.

The thermal conductivity of a homogeneous material may be defined as the rate of heat flow, under stable or steady conditions, through unit area, per unit temperature gradient, in a direction perpendicular to the area.

It is conventional to refer to this thermal conductivity value or factor as a "k" factor which is generally recognized as the standard unit for heat flow comparison although other standards of comparison may be used such as a coefficient in the metric system.

The "k" value or unit representing the thermal conductivity of a material may be more specifically defined as the amount of heat expressed in B.t.u. (British thermal units) transmitted in one hour through one square foot of a homogeneous material one inch thick for a difference in temperature of 1° F. between the two major surfaces of material.

With particular reference to FIGURE 1, there is illustrated diagrammatically the basic components for carrying out the method of the invention. As illustrated in this figure a specimen of the material preferably in two layers of substantially equal thickness designated A and B and of known density computed in a well known manner are arranged in juxtaposed relation with a heat sensing means, heat meter or thermopile disposed between and in contact with the layers and centrally arranged with respect to the marginal regions or peripheries of the layers which extend beyond the edges of the heat meter.

The thermopile or heat meter C is surrounded or shrouded by a guard D formed of suitable material as for example polyethylene resin which is of the same thickness as the thermopile or heat meter C. The specimens A and B of the material to be tested are disposed between a constant temperature heat source E and a constant temperature heat sink F.

The components E and F are preferably in the form of controlled temperature plates, receptacles or tanks hereinafter described in detail in contact with or containing fluids for establishing constant, but differential, temperatures for the plates or tanks. A gauging means G is associated with the components E and F for indicating the proper contact or engagement of the plates or tanks with the specimen layers A and B. The components E and F are adjustable in a manner hereinafter described toward and away from the region of the specimen layers A and B in order to accommodate specimen layers of different thicknesses.

The heat sensing means or thermopile C is also referred to herein as a thermoelectric transducer and may consist of a series of thermo couples which are positioned so that one set of junctions (hot junctions) is in a plane adjacent and parallel to one face of a thin resin plate forming a support and the other set of junctions (cold junctions) is in a plane adjacent and parallel to the other face of the resin plate. The transducer is preferably faced with thin aluminum plates which tend to distribute the heat over the entire surface to minimize the effect of nonhomogeneous regions in the material creating high heat leak paths at thermopile locations.

Heat flow through the transducer or thermopile establishes or generates electromotive force due to the difference in temperature between the hot and cold junctions of the thermopile. This electromotive force or potential is transmitted or conducted by means of conductors I to a suitable indicating or measuring instrument J such as a linear indicator of a D.-C. microvolt amplifier L. A potentiometer or galvanometer may also be employed for the purpose. The instrument L is provided with a multiplier switch M which may be adjusted to selective positions to bring the indicator J within a range to be actuated by the voltage or potential set up in the transducer or thermopile C.

Through the utilization of a constant temperature heat source E in heat transferring relation with a surface of the specimen layer A to be tested and with the constant temperature heat sink F in contact with an outer surface of the other layer or specimen B, and a transducer C disposed between the layers A and B, heat flows from the source E through the material specimen A—B toward the heat sink F. The temperature gradient at the region of the transducer C sets up a potential in the transducer which is indicated in microvolts upon the indicator J.

Through this method, only a few minutes are required to obtain an accurate indication of the heat flow in the transducer translated into microvolts indicated or measured by the instrument J as compared with the so-called guarded hot plate system which requires several hours of time to obtain a reasonably accurate thermal conductivity value for the specimen being tested.

A novel form of apparatus well adapted to carry out the method of the invention is illustrated in FIGURES 3 through 6 inclusive. The fluid circuits for the components of the apparatus are illustrated in FIGURE 8 and the electrical circuits for the electrically actuated and controlled components of the apparatus are diagrammatically illustrated in FIGURE 9.

The apparatus of the invention for carrying out the method is particularly useable in exercising quality control of products being manufactured, and is adaptable for determining the thermal conductivity of various materials. The apparatus is preferably enclosed in a housin or cabinet of a portable character so that it may be utilized in the most advantageous positions in an industrial establishment engaged in fabricating and processing materials such as insulating materials in the form of mats of glass fibers or the like wherein the mat of fibers may embody a binder or adhesive to impart a degree of mass integrity to the product.

As illustrated in the drawings, the apparatus is contained within a substantially rectangular housing or cabinet 20 provided with casters 22 to facilitate moving the apparatus to a location most convenient for conducting testing operations upon materials. The cabinet 20 is equipped with a cover or closure 24 and is preferably fashioned with a rectangular opening 26 which is adapted to be closed by means of a hinged cover or door 28.

The walls of the cabinet 20, the cover 24 and the hinged door 28 are suitably insulated in order that a substantially constant temperature and proper humidity characteristics may be maintained within the cabinet 20. The hinged door 28 facilitates the insertion and removal of layers or specimens of the materials being tested.

While a cabinet is illustrated as enclosing the apparatus in order to maintain proper ambient temperature and humidity conditions, the apparatus may be utilized in a room in which the temperature and humidity characteristics are controlled.

The constant temperature units E and F are in the form of plates, tanks or receptacles designated 30 and 32 respectively which are disposed or mounted in the housing or cabinet 20 in the manner shown in FIGURES 3 and 4. A detailed arrangement of the plates or tanks 30 and 32 and their associated mechanisms are shown in FIGURE 5. Disposed within the housing 20 and mounted upon the lower wall or floor 36 of the housing are transversely extending frame members 38. Mounted upon the members 38 is an auxiliary frame including longitudinally extending L-shaped members 39 and 40 and transversely extending members 41, 41' and 43.

The heat source E which includes the substantially rectangular tank or receptacle 30 having a heat transferring surface 115 and the heat sink F which includes the receptacle 32 having a plate surface 129 are supported in a manner whereby they are adjustable toward and away from one another. Each of the transversely extending frame members 41 supports pads 46 upon which are mounted pairs of bearing or pillow blocks 48. The pairs of blocks 48 support the shafts 42 and 44.

Secured to the bottom wall of the receptacle or tank 30 are spaced pads 52 to which are secured bearing members 54 bored to receive the shafts 42 and 44 whereby the receptacle 30 is slidably supported upon the shafts. The tank or receptacle 32 is similarly supported upon the shafts 42 and 44. Secured to the lower wall of the receptacle 32 are pads 56 to which are secured bearing members 58 which are bored to receive the shafts 42 and 44.

In the embodiment illustrated, means is provided for simultaneously adjusting the positions of the tanks 30 and 32 toward or away from each other. Secured to the member 43 is an L-shaped bracket 60 to which is secured a housing 62. The upper portion of the housing 62 is formed with a boss 64 bored to accommodate a shaft 65, the shaft 65 being connected with an extension shaft 66 by means of a coupling 67. The shaft 66 extends upwardly through an opening in the cover 24 of the cabinet 20, and is equipped with a hand wheel 68 or other suitable manipulating means for rotating the shafts 65 and 66.

Disposed longitudinally and between the shafts 42 and 44 is a shaft 70 having one end journalled in a wall of the housing 62. The ends of the shafts 65 and 70 extending into the housing 62 are respectively provided with bevel gears 72 and 74 in meshing relation whereby rotation of shaft 66 is transmitted to the shaft 70. A region of the shaft 70 adjacent the tank 30 is provided with a right-hand thread 76 and the region of the shaft 70 adjacent the tank 32 is provided with a left-hand thread 78. Secured to the central region of the lower wall of the tank 30 is a bar 80 which supports a member 81 containing a sleeve 82, the latter being threaded to receive the threaded portion 76 of the shaft 70.

Secured to the lower wall of the tank 32 is a bar 85 which supports a member 86 containing a threaded sleeve 87 which cooperates with the left-hand thread 78 formed on the shaft 70. Thus when the shaft 70 is rotated in one direction the receptacles 30 and 32 are simultaneously moved through equal distances toward one another, and when rotated in the opposite direction the receptacles are moved apart.

As previously mentioned, a gauge G is provided for determining the proper adjustment of the positions of tanks 30 and 32 dependent upon the combined thickness of the specimens to be tested. As shown in FIGURES 1, 3 and 4, the receptacle 30 is formed with a forwardly extending member 90 which supports a gauge casing 91. Slidably extending into the gauge housing or casing 91 is a rod 93 having its distal end secured to an L-shaped bracket 95 mounted upon a wall of the receptacle 32.

The portion of the rod 93 extending into the gauge housing 91 is provided with means cooperating with the indicator hand 95 of the gauge and an extension 92 graduated in inches. The gauge G accurately indicates the distances between the adjacent wall or plate surfaces of receptacles 30 and 32.

The heat meter, heat sensing device or thermoelectric transducer C is illustrated in FIGURE 2. The sensing device includes a thermopile 100 which includes a plurality of thermocouples 101 which may be supported in a comparatively thin resin plate 102 which is preferably made of phenolic resin. The leads I—I transmit electromotive force, voltage or potential to the microvolt amplifier L, the potential being indicated in microvolts on the linear indicator J.

The heat sensing unit or transducer C is encased or enclosed in a polyethylene guard D of the same thickness as the transducer unit. The guard completely surrounds and extends a substantial distance outwardly in the plane of the transducer so that the edges of the transducer are not exposed to air currents.

As shown in FIGURES 5 and 6, the guard D surrounding the transducer is suspended by means of hooks or clips 105 from a transversely extending rod 106. The ends of the rod 106 are supported from brackets (not shown) carried by the walls of the cabinet or housing 20.

As shown in FIGURE 5 and 6, a plate or table 108 is disposed beneath and spaced from the lower terminus of the transducer guard D. The table 108 is supported upon pads or blocks 110 secured to bearing members 112 carried by the transversely disposed member 42'.

The members 112 also form bearings providing an intermediate support for the shafts or ways 42 and 44.

The table 108 is adapted to support the layers or specimens A and B of the material to be tested. The arrangement of the guard D and transducer C in assembly with the material specimens A and B is illustrated in FIGURE 7.

The chamber or receptacle 30 forming the constant temperature heat source E is of rectangular configuration. The wall 115 of the tank or receptacle 30 forms a plate or uniplanar surface which is adapted to engage a surface of the specimen or layer A of material to be tested. The upper wall of the tank 30 is provided with an opening into which extends a pumping unit 116 driven by a motor 117 the latter being supported upon the upper wall of the tank 30.

The tank 30 is also equipped with a heating unit 121 preferably of the immersion type shown in FIGURE 3 and is supplied with electric energy to continuously transfer heat to the fluid contained in the tank 30. The heat sink F is inclusive of a tank or receptacle 32 of substantially the same shape, size and construction as the tank 30. The upper wall of the tank 32 is provided with an opening through which extends a pumping unit 118 driven by a motor 119 mounted upon the upper wall of the tank.

The arrangement is inclusive of means for maintaining the tanks or receptacles 30 and 32 at constant, though differential, temperatures. In the embodiment illustrated, circulating fluids are provided, individual to each tank, associated with means for maintaining constant the temperature of the fluid in each tank.

The atmosphere in the cabinet or housing 20 is conditioned or controlled to maintain a constant temperature and a humidity below 50% or more of saturation in a manner hereinafter described in order to prevent the condensation or accumulation of moisture upon the heat sink receptacle 32.

The apparatus is inclusive of a reservoir for supplying fluid to the heat source E and the heat sink F, and a refrigerating and air-conditioning system which serves several purposes as hereinafter explained. As shown in FIGURE 3 there is mounted in one end region of the housing or cabinet 20 a reservoir 122 which supplies fluid, as for example water, to the tanks or receptacles 30 and 32 constituting respectively the heat source E and the heat sink F. A pump 123 preferably of the centrifugal type extends into the fluid reservoir 122 and is driven by an electrically energizable motor 124.

Also mounted adjacent the reservoir 122 is a compressor unit 125 of conventional type driven by an electric motor 126. The operation of the compressor and condenser unit 125 of the refrigerating system is controlled by a thermal switch 127. Actuation of the thermal switch is controlled by the temperature of the fluid in the reservoir 122 to energize or stop the motor of the compressor when the fluid in the reservoir 122 exceeds or falls below a predetermined temperature.

The refrigeration fluid in the compressor and the piping connected therewith may be Freon (dichlorodifluoromethane) or other suitable refrigerant. The compressed refrigerant from the compressor flows through a pipe 130 through a conventional expansion valve 132 and through a heat exchanger 134. The refrigerant from the heat exchanger 134 flows through a pipe or tube 135 and a coil 137 immersed in the water in the reservoir 122, the return pipe 138 conveying the refrigerant to the compressor condenser unit.

Because of the comparatively favorable heat absorption and retention characteristics of water as a temperature controlling and heat transfer fluid, it has been found advantageous as well as inexpensive to utilize water as a medium for controlling the temperatures of the heat source E and the heat sink F. The fluid circuits for conveying water or other temperature controlling fluid from the reservoir through the several components of the apparatus as illustrated diagrammatically in FIGURE 8.

The outlet tube 140 from the pump 123 disposed in the fluid reservoir 122 conveys water from the reservoir through the heat exchanger 134. The tube or pipe 142 from the heat exchanger conveys the water at a comparatively low temperature through a suitable tubular coil 144 with which is associated an air moving or circulating fan or means 146 driven by an electric motor 147 for circulating the air in the cabinet or housing 20 around the coil 144 so as to cool the air in the cabinet and control the temperature of the atmosphere in the cabinet at a predetermined value as, for example, a mean temperature of 75°.

To exercise a control over the interior or ambient temperature of the cabinet, the fan motor 147 may be intercalated in circuit with a thermo-responsive switch 148 (shown diagrammatically in FIGURE 9) contained in the cabinet which may be preset to the mean temperature desired in the cabinet.

Another function of circulating water at a reduced temperature through the coil 144 is to effect a condensation of moisture in the atmosphere in the cabinet upon the coils so as to reduce the humidity within the cabinet sufficiently to prevent the condensation of moisture on the wall of the receptacle 32 which is at a reduced temperature. The condensation accumulating on the coil 144 may be conveyed away by a suitable receptacle placed beneath the coil and adapted to collect the condensation falling from the coil.

The water or other fluid medium is conveyed from the coil 144 through a pipe or tube 149 to a heat exchanger 150 and from the heat exchanger 150 through tube 152 through another heat exchanger 154 and from the heat exchanger 154 through a return pipe 156 into the reservoir 122. It will be apparent from the foregoing that the water from the reservoir 122 flows through a closed circuit through the heat exchanger 134, coil 144 and heat exchangers 150 and 154 and is returned into the reservoir. The pump 123 is operated continuously to assure continuous circulation of cooled water or water at a reduced temperature.

The fluid circuit for the temperature controlling fluid or water in the heat source E viz. the receptacle 30, is a closed circuit independent of the fluid circuit of the reservoir 122. The outlet of the circulating pump 116 in the tank 30 is connected by means of a tube or pipe 160 with a solenoid actuated valve 162 which is normally in closed position. A tube 164 from the solenoid valve 162 extends into the heat exchanger 154. A pipe 165 which is connected through the heat exchanger with pipe 164 completes a circuit into the tank 30. A by-pass channel or pipe 166 is connected with the pipes 160 and 165 to complete a continuous closed fluid circuit from the pump outlet through pipes 160, 166 and 165 into the reservoir. The pump 116 is continuously rotated by the motor 117 so as to circulate fluid such as water in the tank 30 through the by-pass fluid circuit above mentioned.

Immersed in the tank 30 is a thermo-regulator or thermo-switch 170 which may be of the mercury-capillary tube type which, as shown in FIGURES 8 and 9 is connected with the coil of a current relay 172, the switch component 172' of which may be closed to complete the circuit to actuate the solenoid valve 162 which opens the fluid circuit through pipes 160, 164 and 165 through the heat exchanger 154 whereby the water flowing through this fluid circuit is cooled through heat absorption in the heat exchanger 154, thus lowering or reducing the temperature of the water in the tank 30.

When the temperature of the water in the tank 30 has been reduced to the predetermined value, the thermo-regulator 170 interrupts the circuit through the current relay 172 to close the valve 162 and interrupt the flow of fluid through the heat exchanger 154. Thereafter the circulation of water from the pump 116 continues through the by-pass 166 as long as the thermo-regulator 170 is not in circuit-closing position.

Thus the immersion heater 121 continuously supplies a constant flow of heat into the water or fluid in the tank 30, and, when the temperature of the water in the tank 30 exceeds a predetermined value, the thermo-regulator switch 170 is closed and water circulated through the heat exchanger 154 until the temperature of the fluid or water in the tank 30 is reduced to its proper temperature.

Similar fluid circulating and by-pass circuits are provided for the heat sink F, this arrangement being illustrated diagrammatically in FIGURE 8. The outlet of the circulating pump 118 disposed in the tank 32 is connected by a tube 175 with a solenoid controlled valve 177. The valve 177 is connected by means of a tube 179 through the heat exchanger 150 and with a tube 181 which is in communication with the tank 32. A by-pass tube 183 is in communication with pipes 175 and 181. The pump 118 is continuously operated and fluid such as water in the tank 32 is continuously circulated through the by-pass circuit comprising pipes 175, 183 and 181.

A thermo-regulator or thermo-switch 185 of the same type as the thermo-regulator 170 is immersed in the tank 32 and is connected in circuit with a coil of a relay 187. The switch component 187' of the relay 187 when closed completes a circuit through the solenoid coil 188 of the solenoid actuated valve 177 to establish fluid flow through pipe 175, valve 177, pipe 179, heat exchanger 150 and return pipe 181.

When the temperature of the water or fluid in the heat sink F (tank 32) exceeds a predetermined temperature, the thermo-regulator 185 is actuated to circuit-closing position to energize the relay 187 and the coil of the solenoid actuated valve 177, and fluid is circulated through the heat exchanger 150. Heat is transferred from the water in the tanks 32 in the exchanger 150 until flow through the heat exchanger is interrupted by the opening of the circuit in the thermo-regulator 185 to effect a closing of the solenoid actuated valve 177. Thereafter the fluid or liquid in the heat sink or tank 32 is circulated through the by-pass 183 until a subsequent temperature change of the water in the tank effects a closing of the thermo-regulator or switch 185.

FIGURE 9 illustrates the electrical circuits of the hereinabove described components of the apparatus. The indicating or measuring instrument L of the microvolt amplifier type is in circuit with the current supply lines L1 and L2. The leads I—I connect the microvolt amplifier L with the output of the thermoelectric transducer C disposed between the layer A and B of the specimen of the material to be tested for heat conductivity value. The fan motor 147 for operating the cabinet air circulating fan 146 is connected with a thermostat or thermoresponsive switch 148 which serves to maintain a constant temperature within the cabinet or housing 20. The thermal switch 127 is in circuit with the motor 128 of the compressor 125 and serves to control the operation of the compressor.

It has been found that for the most efficient and effective use of the method and apparatus for quality control test purposes that the layers or components of the test specimens should not exceed a combined thickness of 3" and hence each of the layers A and B should not exceed a thickness of 1½".

As an example of practical application of the method, the heat meter or transducer C approximately 9" square is disposed in the center of a polyethylene guard plate D approximately 18" square and of a thickness substantially the same as the thickness of the transducer. The guard D has negligible effect on the specimens of material being tested.

In the testing operation computation determining the thermal conductivity value of a specimen, tests are made by a comparison with a precalibrated specimen having stable thermal value determined by the guarded hot plate method accepted as standard. The apparatus constant, C, is obtained by calibrating the apparatus with the known thermal conductivity values of the calibration specimen. In this connection the temperature gradient and the heat meter or transducer sensitivity govern the value of the constant C and may be shown by the following expression:

$$C = k/dv$$

where:

$k$=thermal conductivity of calibration specimen.
$d$=distance between the specimen engaging plates or surfaces 115 and 129 less the thickness of the heat meter or transducer.
$v$=transducer output potential for a given temperature differential between the plates or surfaces 115 and 129.

A substantial temperature differential is normally maintained between the tanks 30 and 32, and it is desirable from a standpoint of practical operation to maintain the temperature differential at a value which will obtain a mean temperature of about 75° F. or close to normal room temperature. As an example, the temperature of the heat source E tank 30 may be controlled at 95° F. and the temperature of the heat sink F (tank 32) is controlled at 55° F. providing a 40° F. differential and a mean temperature of 75° F. It has been found that a 40° F. drop or differential through the specimen of material to be tested produces ample measurable electromotive force or output potential from the heat meter or transducer C. Other temperature differentials and mean temperatures may be established for carrying out the tests if desired.

A typical operation of the steps in the method of determining the thermal conductivity of a specimen of material is as follows:

The specimen to be tested is preferably in the form of two or any even number of pieces or layers of substantially equal thickness which may be accommodated in the apparatus. The layers should be substantially square and of a dimension slightly less than the dimensions of the polyethylene guard D. Current is supplied to the microvolt meter or measuring instrument L and with the door in the cabinet cover 28 in open position, the tanks 30 and 32 are backed away or separated from each other by manipulation of the hand wheel 68.

The specimen layers A and B are then positioned one at each side of the guard D and the heat meter or transducer C, the layers being supported by the table or plate 108 shown in FIGURE 5. The test specimen should then be centered with respect to the plastic guard D. The compressor 125, fan 146 and the pumps 116, 118 and 123 should be operated for a sufficient period of time prior to conducting a test to establish a cabinet temperature of about 75° which is controlled by the thermostat 148 and the fluid in the tanks 30 and 32 brought to the proper temperatures of, for example, 95° F. and 55° F. respectively.

The hand wheel 68 is then manipulated, rotating the threaded shaft 70 and moving the tanks or receptacles 30 and 32 toward each other whereby the surfaces or walls 115 and 129 of the tanks which form heat transfer plates are moved into contiguous relation and substantially full area contact or engagement with the exterior major surfaces of the layers A and B respectively.

This condition is obtained when the gauge G indicates 3″ or the combined thickness of the layers forming the test specimen. If, for example, the specimen layers A and B are each 1″ in thickness, the tanks 30 and 32 are adjusted until the gauge G indicates a distance between the plate surfaces 115 and 129 of 2″ and the door 28 then closed.

The gauge G is precalibrated to compensate for the thickness of the heat sensing device or thermoelectric transducer C. The plates or surfaces 115 and 129 of the tanks being in intimate contact with the outer major surfaces of the specimen layers A and B and the layers being in intimate contact with the transducer C, heat flow is initiated from the plate 115 at the higher temperature, viz. 95° F. through the specimens and the transducer toward the heat sink plate or surface 129 which is at a temperature of 55° F.

The test should be continued for a period of time required to establish a stable heat flow through the specimen indicated by substantially constant potential across the heat meter or transducer, the period of time being dependent, in a measure upon the relative density of the specimen being tested. For example it has been found that a test specimen having a density of between .50 to 1.75 pounds per cubic foot requires a period of heat flow of approximately ten minutes until a constant heat flow is established through the transducer C and specimen from plate 115 to the plate 129. Material of a density between 1.76 to 3.00 pounds per cubic foot may require a test period of approximately fifteen minutes, and a material of a density of between 3.01 to 5.00 pounds per cubic foot may require a test period of twenty minutes before a constant heat flow indication is attained.

As the transducer C is connected through the lead wires I—I with the measuring instrumentality or microvolt amplifier L a linear indication or measure in microvolts is obtained of the electromotive force or potential proportionate to the heat flow through the specimen and the transducer C.

At the end of the test time, the scale multiplier switch M on the instrument L is moved until the indicating needle or hand 195 comes to rest within a predetermined range on the dial J where the linear indicator has a total range of 100 micro-volts. The thermal conductivity or "$k$" value of the material may be quickly computed from the dial reading in microvolts by simple multiplication as follows: The $k$-value equals the dial reading (in microvolts) × the scale multiplier constant (the multiplier factor indicated by the setting of the switch M) × the test thickness of the specimen × a known heat meter or transducer constant for the particular transducer employed in the apparatus.

Thus by comparison of the $k$-value found for the specimen with the standard thermal conductivity value for the material of known dimensions, the difference between the $k$-value of the standard and the $k$-value of the specimen being tested provides a direct measurement of the deviation in thermal conductivity of the material under test from a predetermined standard.

During the test period, the fluid circulating pumps in the reservoir 122, the constant temperature heat source or tank 30 and the heat sink provided by the receptacle 32 are continuously rotated. The pump 123 in the reservoir serves to continuously deliver fluid such as water through the heat exchangers 134, 144, 150 and 154 at a temperature below the temperature of the heat sink provided by the receptacle 32. By this arrangement, water at a reduced temperature is constantly available for quickly bringing the temperatures of the fluids in the tanks 30 and 32 to their proper norms upon actuation of the solenoid controlled valve 162 for the tank 30 and the solenoid controlled valve 177 for the tank 32 in the manner hereinbefore explained.

The foregoing described method provides an efficient, accurate and comparatively quick means of measuring the thermal conductivity of a material by measuring the thermal differential translated in electrical units by a heat sensing means or transducer associated or engaged with a specimen of material in a plane passing through the central region of the specimen in heat transferring relation therewith through which a thermal gradient is established. It is to be understood that the heat sensing component or transducer has a calibration constant being a proportionate factor of temperature differential and rate of heat flow and the principle of the method of the invention is the measurement or indication of the magnitude of the thermal differential across the transducer as a proportion of the total temperature differential across the combined specimen and the transducer. The temperature differential across the transducer will vary dependent upon the thermal conductivity of the test specimen enclosing it, thus the conductivity of the test specimen is, in effect, ascertained by comparison with the conductivity of the transducer.

While a refrigeration system is illustrated as employed for maintaining the requisite temperature for the cold tank, it is to be understood that if the cold tank were maintained at a temperature above that of a normal water supply, then tap water may be utilized for temperature control without refrigeration.

While a heat sensing means or component provided by a group or series of thermocouples 101 of a thermopile 100 wherein one set of junctions (hot junctions) is in a plane adjacent and parallel to one face of the plate and the other set of junctions (cold junctions) is in a plane adjacent and parallel to the other face of the plate, and heat flow through the sensing means or transducer is effective to generate an electro-motive force by reason of the difference in the temperature between the hot and cold junctions of the thermopile, other means responsive to differential temperatures may be utilized in combination with a specimen of material to be tested for indicating or measuring the thermal conductivity of a material. It is to be further understood that the aforementioned sizes and shapes of the test specimens and components of the apparatus are exemplary only, the invention contemplating the application of the principles of the method to apparatus of other shapes and sizes. The method and apparatus may be utilized for testing various materials to ascertain the thermal conductivity values thereof where the materials have heat retarding or insulating characteristics such that a temperature differential or thermal gradient may be established in the material which is capable of measurement on a thermal gradient measuring instrumentality.

It is apparent that, within the scope of the invention, modifications and different arrangements may be made other than is herein disclosed, and the present disclosure is illustrative merely, the invention comprehending all variations thereof.

I claim:

1. Apparatus for determining heat flow characteristics of materials including, in combination, a pair of elements of differential temperatures adapted to respectively engage exterior parallel surfaces of a specimen of material, a thermoelectric transducer disposed in the specimen in a plane parallel to the surfaces and midway between the exterior major surfaces of the specimen, portions of the specimen extending beyond the transducer whereby the transducer is contained within the specimen, means for supplying heat to the element of highest temperature to effect heat flow through the specimen of material and thermoelectric transducer toward the element of lower temperature, means arranged in contact with the elements for reducing the temperatures thereof to maintain a predetermined temperature differential between them, and an instrumentality connected with the thermoelectric transducer for measuring the magnitude of the electromotive force generated by heat flow through the transducer.

2. Apparatus for measuring thermal conductivity characteristics of insulating material including, in combination, a housing, means for controlling the temperature and humidity in the housing including a source of refrigeration, a pair of receptacles disposed within the housing each adapted to contain a fluid, means for circulating fluid through the receptacles for maintaining the receptacles at differential temperatures, a heat source for supplying heat to the fluid in the receptacle of higher temperature, a heat exchanger connected with each receptacle adapted to receive fluid at reduced temperature from the source of refrigeration, electrically actuated heat responsive means for each receptacle, valve means operated by the heat responsive means for controlling the flow of the fluids in the receptacles through the respective heat exchangers, means for adjusting the relative positions of the receptacles into heat transferring engaging relation with opposed surfaces of a dual layer specimen of insulating material wherein the layers are of substantially equal thickness and density, a thermoelectric transducer disposed between and in contact with the two layers of the specimen of insulating material, and indicating means connected with the transducer for measuring the potential established by heat flow through the material.

3. Apparatus for determining the relative thermal conductivity of compressible materials including, in combination, a heat source, a heat sink, said heat source and heat sink being spaced to receive a quantity of the compressible material, said heat source and heat sink engaging parallel outer major surfaces of the quantity of material, a heat meter of planar shape disposed within the quantity of material in a plane bisecting the quantity of material and parallel with the surfaces engaged by the heat sink and heat source, said heat meter being adapted to generate a potential under the influence of heat flow therethrough, means for maintaining the respective temperatures of the heat source and heat sink substantially constant, and indicating means connected with the heat meter for measuring the potential set up by heat flow through the material and heat meter.

4. Apparatus for measuring heat flow characteristics of materials including, in combination, a housing, means for controlling the temperature and humidity in the housing, said means including a source of refrigeration, a pair of members disposed in said housing and spaced to receive a specimen of material in heat transferring relation therewith, said members being at differential temperatures, means for circulating fluids in contact with said members for establishing and maintaining the temperatures of said members, a heat exchanger connected with each of said members, means individual to each of said members for controlling the flow of temperature maintaining fluid through the adjacent heat exchanger, said heat exchangers adapted to receive refrigerated fluid for maintaining the fluids circulating in contact with said members substantially constant at their differential temperatures, a source of heat for supplying heat to the fluid circulating in contact with the member of higher temperature, a thermopile of planar shape embedded between sections of equal thickness of the specimen and in contact with the adjacent surface areas of the sections, and a microvolt amplifier connected with the thermopile for indicating the magnitude of the potential set up by heat flow through the specimen and thermopile.

5. Apparatus for measuring heat flow characteristics of materials including, in combination, a housing, means for controlling the temperature and humidity in the housing, said means including a source of refrigeration, a pair of members disposed in the housing and spaced to accommodate a dual-section specimen of material to be tested wherein the sections are of substantially the same thickness and density, means for circulating fluids of different temperatures in contact with said members for establishing differential temperatures of said members, means supporting said members for adjusting the members into heat-transferring relation with the specimen of material, a heat exchanger connected with each of said members, valve means individual to each of said members for controlling the flow of temperature maintaining fluid through the adjacent heat exchanger, temperature responsive means individual to each of said members for controlling the said valve means, said heat exchangers adapted to receive refrigerated fluid for maintaining the circulating fluids in contact with said members substantially constant at their respective differential temperatures, a source of heat for supplying heat to the member of higher temperature, a heat responsive transducer disposed between and in contact with the inner surfaces of the sections of the specimen of material, and an electromotive force indicating means connected with the transducer for indicating the electromotive force generated by heat flow through the sections of the specimen.

References Cited in the file of this patent

UNITED STATES PATENTS

| | | |
|---|---|---|
| 1,528,383 | Schmidt | Mar. 3, 1925 |
| 2,347,661 | Butland | May 2, 1944 |
| 2,484,736 | Razek | Oct. 11, 1949 |
| 2,510,952 | Brewster | June 13, 1950 |
| 2,798,377 | Brownlee et al. | July 9, 1957 |

FOREIGN PATENTS

| | | |
|---|---|---|
| 713,640 | France | Aug. 17, 1931 |
| 587,996 | Great Britain | May 12, 1947 |

OTHER REFERENCES

Article: Apparatus for Measurement of Thermal Conductivity of Solids, by Weeks et al. in The Review of Scientific Instruments, vol. 24, No. 11, November 1953, pages 1054–57. Copy in 73–15.